H. A. BUDDE.
REVERSING MECHANISM.
APPLICATION FILED FEB. 24, 1908.

912,360.

Patented Feb. 16, 1909.
2 SHEETS—SHEET 1.

Witnesses:
H. E. Anderson
Fred H. Carpenter

Inventor:
H. A. Budde
By his Attorney,
Wm H. Blodgett

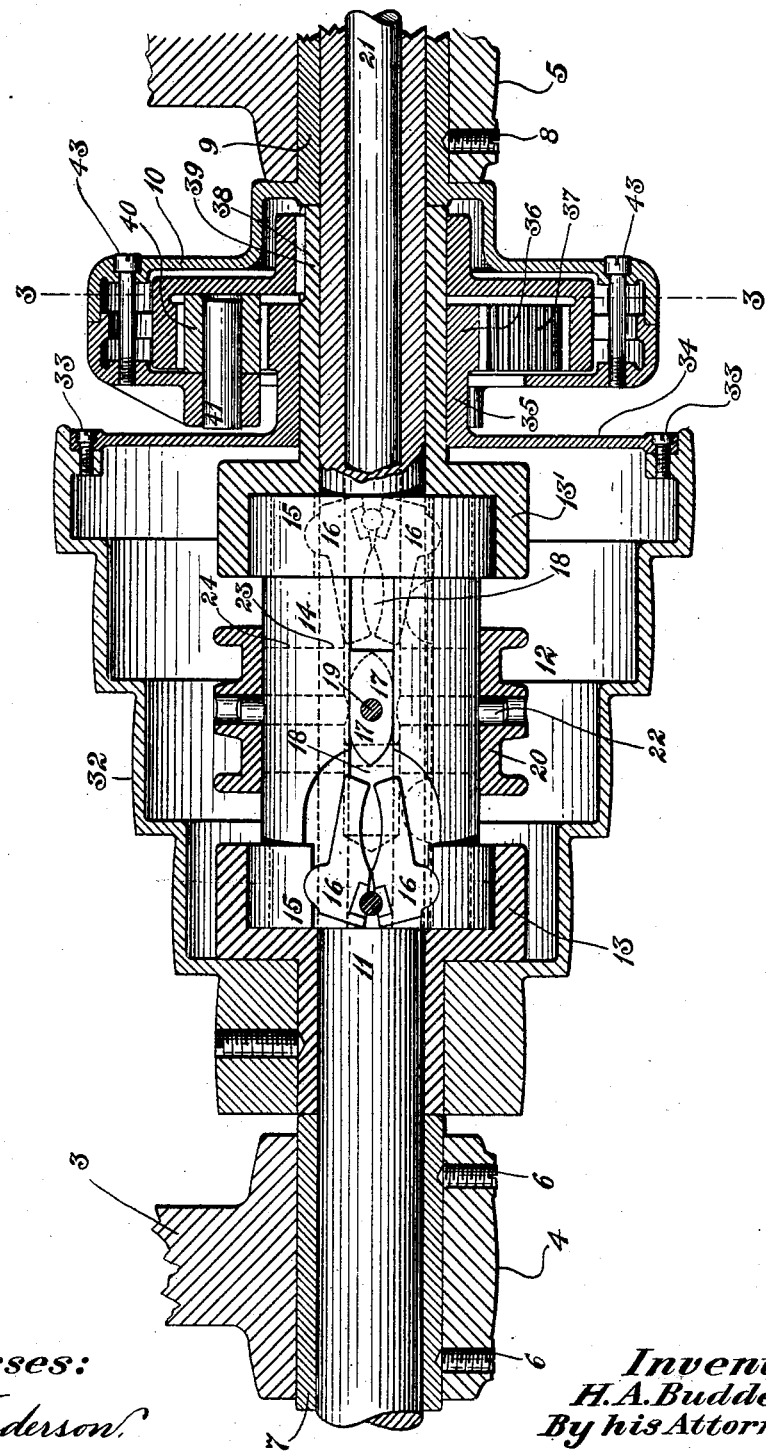

UNITED STATES PATENT OFFICE.

HENRY A. BUDDE, OF HARTFORD, CONNECTICUT.

REVERSING MECHANISM.

No. 912,360.　　　Specification of Letters Patent.　　　Patented Feb. 16, 1909.

Application filed February 24, 1908. Serial No. 417,486.

*To all whom it may concern:*

Be it known that I, HENRY A. BUDDE, a citizen of the United States, residing at Hartford, in the county of Hartford and State of Connecticut, have invented certain new and useful Improvements in Reversing Mechanism, of which the following is a specification.

This invention relates to reversing mechanism especially adapted for use in connection with lathes and other machines, and has for its object the provision of a countershaft mechanism of much greater compactness and more simplified construction than has been heretofore commonly employed.

A further object of the invention is the provision of gearing and a clutch mechanism by means of which a driving pulley mounted on the same shaft therewith may be caused to rotate in either direction or remain at rest as desired.

Other objects of the invention will be hereinafter set forth.

Figure 1:
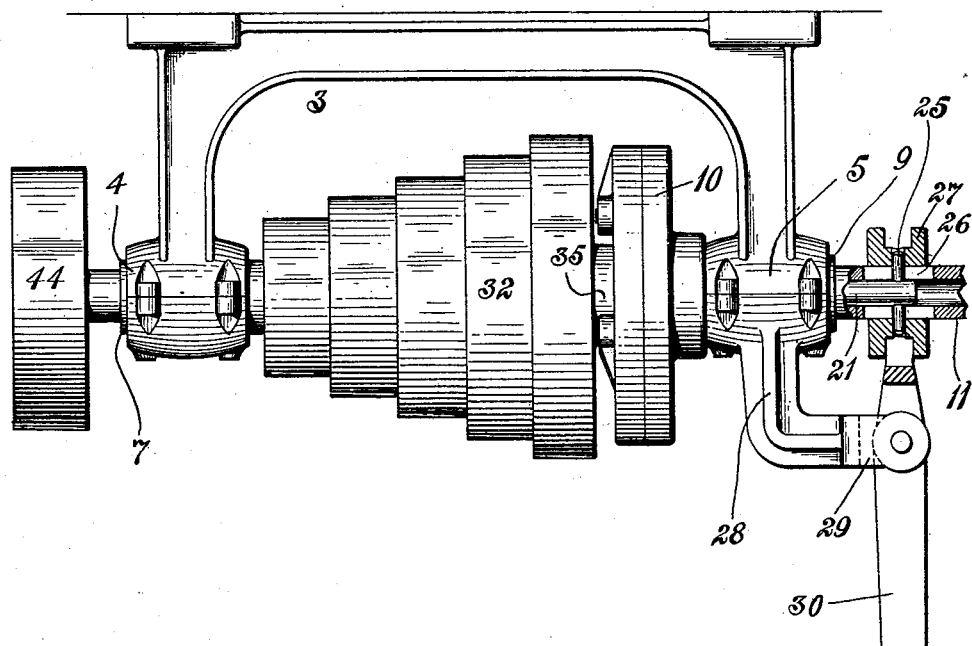
Figure 3:
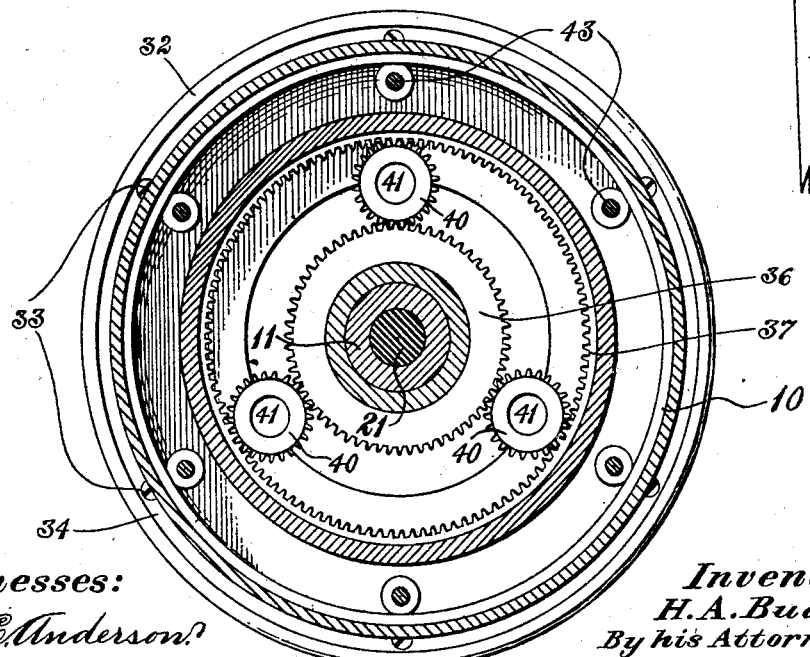

In the accompanying drawings, Figure 1 is a side elevation of mechanism comprising my invention. Fig. 2 is a vertical longitudinal sectional view thereof, parts being shown in elevation, and Fig. 3 is a transverse sectional view on line 3—3 of Fig. 2.

Like numerals designate similar parts throughout the several views.

Referring to the drawings the numeral 3 designates a hanger frame which is provided with bearings 4 and 5. Secured within the bearing 4 by set screws 6 is a bushing 7 and within bearing 5 by set screws 8 is the hub 9 of a casing or frame 10. Journaled in said bushing 7 and hub 9 is a shaft 11 having mounted thereon intermediate the bearings 4 and 5 a clutch which is designated in a general way by the numeral 12, said clutch as shown being commonly known as a friction clutch and comprising a pair of cup-shaped members 13, 13′ loosely mounted upon shaft 11 on either side of a sleeve 14, which is rigid with said shaft. Keyed on the ends of sleeve 14 within members 13, 13′ are friction rings 15, normally of a diameter somewhat less than the inside diameter of said members, but adapted when expanded to become rigid therewith. The expansion of these rings is accomplished by means of toggle levers 16, a pair of which is suitably mounted with relation to each ring. The toggle levers are actuated by wedges 17 which are located in channels 18 and secured by pins 19 to a collar 20 which is slidably mounted upon sleeve 14. Carried by a rod 21 inserted in a hollow portion of the shaft 11 is a pin 22 which extends through slots 23 and 24 in shaft 11 and sleeve 14, respectively, and engages the collar 20. A similar pin 25 is carried in the other end of rod 21 and extends through a slot 26 in shaft 11 to engage the collar 27 loosely mounted thereon. Depending from bearing 5 is an angular arm 28 having pivoted in its bifurcated end 29 a lever 30 by means of which collar 27 together with rod 21, collar 20, and wedges 17 may be shifted to accomplish the result desired.

Rigid with the clutch member 13 is a step-pulley 32 such, for instance, as may be employed for driving the similar pulley of a lathe. Secured to the large end of said pulley by screws 33 is a flange 34 projecting from the hub 35 of a gear 36 which is concentric to and in the same plane with an internal gear 37, located within casing 10 and keyed at 38 to the hub 39 of clutch member 13′, said hub passing loosely through gear 36. Interposed between gear 36 and internal gear 37 are a series of idler pinions 40 mounted on studs 41 carried by casing 10. In order that the various parts may be assembled, it is necessary to make casing 10 in two parts, said parts being secured together by screws 43.

Adjacent the outer end of bearing 4 and keyed to the shaft 11 is a pulley 44 by means of which said shaft may be rotated at the proper speed.

In the operation of the device it is clearly apparent that,—1. If the clutch actuating mechanism is in a neutral position the pulley 32 will remain at rest. 2. If clutch member 13 is made rigid with shaft 11 pulley 32 will rotate therewith. 3. If clutch member 13′ is made rigid with shaft 11 the internal gear 37 will be rotated therewith, and, through the idlers 40, gear 36 together with pulley 32 will be rotated in the opposite direction.

Any suitable form of clutch may be substituted for the one shown, also various changes in other respects may be made without departure from the invention and it is distinctly to be understood that it is not limited to the exact construction illustrated and set forth.

Having thus described my invention what I claim is,

1. The combination of a hollow power-transferring device, a clutch-device rotative with said power-transferring device, a stationary support independent of and outside the power transferring device, a plurality of gears in mesh with each other, a second clutch-device one of the gears being rotative with said power-transferring device, another being rotative with said second clutch-device and the third being rotatively supported by said support, and a clutch-member to alternately engage said clutch-devices said clutch-member and said clutch-devices being inclosed by said power-transferring device.

2. The combination of a hollow, power-transferring device having a closing-plate, a pair of clutch-devices inclosed by said power-transferring device, a train of gears, one end gear of the train being rotative with one of said clutch-devices and the other being rotative with the power-transferring device, the latter being rotative with the other of said clutch-devices, a boxing outside the hollow, power-transferring device for inclosing said train of gears and for supporting the intermediate one thereof, and a clutch-member for alternately engaging said clutch-devices.

3. The combination of a hollow, power-transferring device having a closing plate at one end thereof provided with an outwardly extending hub, a pinion rotative with said hub, a clutch-device inclosed by said power-transferring device and also having an outwardly-extending hub on which said other hub is loosely mounted, an internal gear rotative with the hub of said clutch-device, a stationary boxing, a pinion rotatively supported by the boxing and meshing with said pinion and internal gear, the boxing inclosing the pinions and internal gear, a second clutch-device inclosed by the power-transferring member and having an outwardly extending hub to which said power-transferring member is keyed, a shaft extending loosely through the clutch-devices, and a clutch-member fastened to the shaft and movable to put said clutch-devices alternately into driving relation with said shaft.

In testimony whereof I affix my signature in presence of two witnesses.

H. A. BUDDE.

Witnesses:
F. E. ANDERSON,
M. C. BLODGETT.